Oct. 12, 1954 D. LEYPOLD 2,691,726
CIRCUIT ARRANGEMENT FOR ADJUSTING THE FREQUENCY DURING THE OPERATION OF DIVERSITY RECEIVER SYSTEMS
Filed Oct. 3, 1950
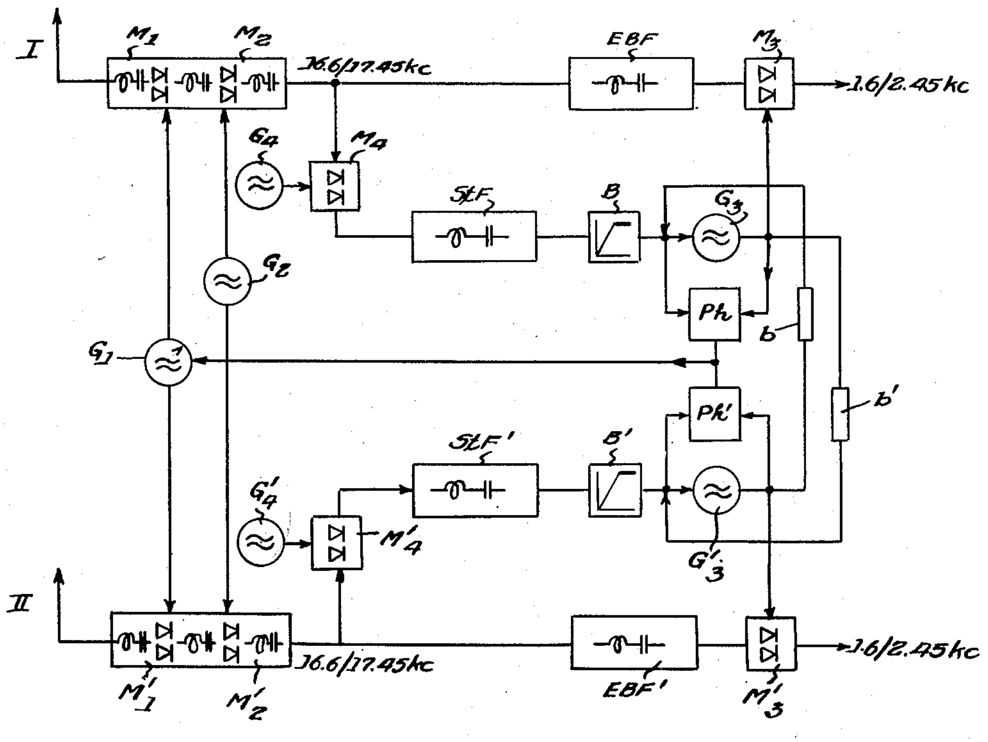
Inventor:
Dieter Leypold.
By [signature] Atty.

Patented Oct. 12, 1954 2,691,726

UNITED STATES PATENT OFFICE 2,691,726

CIRCUIT ARRANGEMENT FOR ADJUSTING THE FREQUENCY DURING THE OPERATION OF DIVERSITY RECEIVER SYSTEMS

Dieter Leypold, Munich, Germany, assignor to Siemens & Halske, Aktiengesellschaft, Munich, Germany, a corporation of Germany Application October 3, 1950, Serial No. 188,228

5 Claims. (Cl. 250—20)

This invention relates to diversity receiving systems, and is particularly concerned with the adjustment or regulation of the frequency during the operation of such systems.

A frequency adjustment during operation is required, e. g., in receiver systems in which wireless messages which are transmitted in the form of two side bands and a carrier frequency are transformed in a single-side band receiver into a lower frequency position. The message received is conducted to the single-side band receiver, if necessary, after transformation into an intermediate frequency range, where it is transformed into a lower frequency range in one or more modulation stages. The carrier frequency (control frequency) which is likewise transformed is then filtered out over a narrow control frequency filter and is utilized as a locking voltage for the carrier frequency oscillator or directly as a carrier frequency for the succeeding modulation stage in which one of the side bands is transformed into the lower frequency range.

A very narrow filter is required for separating the control frequency from the side bands. In order to make sure that the control frequency corresponds to the pass frequency of the filter, it is necessary to provide during operation for a frequency adjustment of the carrier frequency oscillator of a modulation stage which precedes the control frequency filter. The frequency adjustment must provide for the regulation of small and rapid frequency variations as well as for the regulation of relatively slow and greater frequency variations.

The frequency adjustment is so arranged that the deviations of the control frequency from the proper operating frequency, for example, of the median frequency of the control frequency filter, is taken as a criterion for the frequency adjustment of the carrier frequency oscillator of a modulation stage which precedes the control frequency filter. This may be done by comparing in a phase bridge or the like the control frequency voltage at the input and at the output of the control frequency filter or the locking voltage of the oscillator and the oscillator voltage, and utilizing the resulting voltage which is proportional to the phase difference for governing the frequency adjustment.

Satisfactory operation is possible in a double or multiple channel receiver, that is, in a receiver which coacts with a plurality of separate antennas and which is equipped with separate receiving systems, even under considerably worse receiving conditions than may obtain in the case of a simple receiver. It is desirable therefore to accomplish, in the case of diversity receiving, a far-reaching increase in the frequency stability.

The improvement which may be obtained in the case of diversity receiving is due to the fact that all receiving channels are not simultaneously affected by fading, so that at least one channel may be employed in the transmission of a message. The invention furnishes the possibility of improving the frequency stability by utilizing that receiving channel which may at any time properly operate for the frequency adjustment of the other channels.

In accordance with the invention, a regulating voltage is formed in each receiving channel, which is proportional to the phase- and the frequency deviation, respectively, of the control frequency, and the regulating voltages thus produced and connected in parallel or in series are utilized in common for the control of the synchronously operating carrier frequency oscillaters and a common carrier frequency oscillator, respectively, of corresponding modulation stages in the individual receiving channels. The oscillators of the remaining modulation stages in the individual receiving channels which precede the control filter are arranged to operate in synchronism, and common oscillators are to be provided for the mutually corresponding modulation stages in the individual receiving channels. Only the oscillators which succeed the control frequency filters are separate for each receiving channel. The use of common oscillators assures the proper phase relationship from the antenna down to the low frequency.

It has been proposed, for the receiving of signals from frequency-keyed telegraph transmitters, to utilize for the frequency adjustment during operation the frequencies corresponding to the marker current as well as to the spacing current. In accordance with this proposal (see, for example, co-pending application Ser. No. 188,628, filed October 5, 1950, now Patent No. 2,641,650, dated June 9, 1953) the frequencies corresponding to the marker- and to the spacing currents are transformed in an auxiliary modulator arrangement into an identical frequency range and conducted over a common narrow control frequency filter to obtain the carrier frequency and the locking voltage for the oscillator of the last or one of the last transformation stages; and over a phase bridge or the like is obtained an adjusting voltage for the carrier frequency oscillator of a modulation stage which precedes the control frequency filter. It is possible to proceed in similar manner in the case of diversity receiving from frequency-keyed telegraph transmitters; that is, the marker- as well as the spacing currents may be utilized in the individual receiving channels for producing the regulation voltage.

The invention further utilizes for the purpose of producing regulation voltages, at least in one receiver channel, the frequency corresponding to the spacing current and, at least in one other receiving channel, the frequency corresponding to the marker current. These frequencies are then transformed into the identical frequency range.

The invention will now be described with reference to the accompanying drawing showing an embodiment which illustrates in diagrammatic manner an example of a frequency-keyed telegraph receiving system.

It is assumed that the diversity receiver has the two receiving channels I and II. The messages received are transformed into the intermediate frequency range in the modulators $M_1$, $M_2$ and $M_1'$, $M_2'$, respectively. It is further assumed that the frequencies vary in the intermediate frequency range from 16.6 to 17.45 kc. A side band is conducted to the modulators $M_3$ and $M_3'$, respectively, over the single-side band filters EBF and EBF', respectively, such side bands having a carrier frequency of 15 kc. In the output will then result frequencies varying from 1.6 to 2.45 kc. The oscillators $G_1$ and $G_2$ of the first two modulation stages are common to both receiving channels; the secondary oscillators $G_3$ and $G'_3$, however, are separate for the respective channels. The intermediate frequency 16.6 of the receiving channel I is modulated with 1.6 kc. (oscillator $G_4$) in the control frequency modulator $M_4$, and the locking voltage of a frequency of 15 kc. is conducted to the oscillator $G_3$ over the control frequency filter *StF*. The frequency 17.45 kc. of the receiving channel II, is used for producing the regulation- and locking voltage. It is modulated with 2.45 kc. (oscillator $G'_4$) in the control frequency modulator $M'_4$, and the 15 kc. frequency which occurs as the modulation product is conducted to the oscillator $G'_3$ over the control frequency filter *StF'*.

The locking voltage and the output voltage of the oscillator $G_3$ are compared in the phase bridge *Ph*, thus resulting in one regulation or adjusting voltage. Another regulation or adjusting voltage is produced in similar manner by a comparison of the locking voltage and the output voltage of the oscillator $G'_3$ in the phase bridge *Ph'*. These two regulation voltages are connected in parallel and are utilized for the frequency adjustment of the oscillator $G_1$.

In the example under consideration, spacing current is used for the frequency adjustment in one receiving channel, and marker current in the other.

In order to obtain operation of the oscillators $G_3$ and $G'_3$ with proper and identical frequency, the output of each oscillator is coupled with the input of the other, in each case over a damping device, as shown at *b* and *b'*, respectively. Each oscillator therefore receives, at such times when it does not obtain a locking voltage over its associated control frequency filter, a substitute locking voltage from the other oscillators over the respectively associated damping device. The damping is so adjusted that the resulting voltage is smaller than the proper locking voltage of the associated oscillator. The effect of each oscillator on the other is thereby less than the effect obtained by the locking voltage from the associated control frequency filter, and the voltages from such filters are thus effective to control the oscillators so as to coact with their respective phase bridges in producing regulation voltages for a clear-cut adjustment of the frequency of the oscillator $G_1$.

The amplitude of the locking voltages conducted to the oscillators $G_3$ and $G'_3$ from the control frequency filters *StF* and *StF'*, respectively, is regulated to constant amplitude by limiters B and B', respectively, thereby making the relationship of the two voltages independent of the strength of the transmitted signals.

An advantage of the invention, aside from the frequency adjustment, resides in absolutely accurate frequency, and even correction of discrepancies in the amounts of transmitted frequency variations, thus furnishing the possibility to employ in short wave transmission the relatively small amounts of frequency variations usually employed in median and long wave transmission. The frequency accuracy in short wave transmission amounted until now to ±50 cycles and the frequency variations therefor had to be in amounts up to 850 cycles. Smaller frequency variations require greater accuracy. However, the filters may then be narrower, contributing to improvement in the noise level.

Changes may be made within the scope and spirit of the appended claims.

I claim:

1. In a diversity receiving system having two channels for receiving an incoming carrier which has been modulated by signals at the transmitter, a modulator for each channel for transforming said carrier to an intermediate frequency range, a common oscillator for said modulators, and a device for adjusting the frequency of said common oscillator during the operation of the system, said device comprising a secondary oscillator individual to each channel, means individual to each channel for filtering from the intermediate frequency thereof a control frequency to produce a locking voltage for the secondary oscillator associated with the respective channel, damping means for interconnecting the output of each secondary oscillator with the input of the other secondary oscillator, control means cooperating with each secondary oscillator for producing a regulating voltage, and means for conducting to said common oscillator both of the regulating voltages produced by said control means to adjust the frequency of said common oscillator.

2. In a diversity receiving system having two channels for receiving an incoming carrier which has been modulated by signals at the transmitter, a modulator for each channel for transforming said carrier to an intermediate frequency range, a common oscillator for said modulators, and a device for adjusting the frequency of said common oscillator during the operation of the system, said device comprising a secondary oscillator individual to each channel, means individual to each channel for filtering from the intermediate frequency thereof a control frequency to produce a locking voltage for the secondary oscillator associated with the respective channel, means for maintaining constant the amplitude of said locking voltage, control means cooperating with each secondary oscillator for producing a regulating voltage, and means for conducting to said common oscillator both of the regulating voltages produced by said control means to adjust the frequency of said common oscillator.

3. In a diversity receiving system having a plurality of channels each having individual modulator means for receiving an incoming carrier which has been modulated by signals at the transmitter and for transforming said carrier and signals to an intermediate frequency range, a common oscillator for said modulator means, and a device for regulating the frequency of said common oscillator during the operation of the system, said device comprising secondary modulating means for modulating the intermediate frequency in each channel to produce a control frequency, a secondary oscillator for each channel, means for filtering said control frequency in each channel to produce a locking voltage for the associated secondary oscillator, a phase bridge disposed in parallel with each secondary oscillator for comparing the input and output thereof so as to determine deviations in said filtered control frequency and to produce a regulation voltage which is individual to the associated channel, and means for combining the regulation voltages of both channels to regulate the frequency of said common oscillator.

4. The apparatus defined in claim 3, comprising circuit means for interconnecting the output of the secondary oscillator in each channel with the input of the secondary oscillator in the other channel, and current-limiting means in said circuit means.

5. The apparatus defined in claim 3, comprising circuit means for interconnecting the output of the secondary oscillator in each channel with the input of the secondary oscillator in the other channel, current-limiting means in said circuit means, and amplitude-limiting means in the input of each secondary oscillator.

References Cited in the file of this patent

UNITED STATES PATENTS

| Number | Name | Date |
|---|---|---|
| 2,316,017 | Peterson | Apr. 6, 1943 |
| 2,333,335 | Peterson | Nov. 2, 1943 |
| 2,341,649 | Peterson | Feb. 15, 1944 |
| 2,543,256 | Peterson | Feb. 27, 1951 |
| 2,562,943 | Pensyl | Aug. 7, 1951 |